J. S. Stephenson.
Carburetor.
N°. 63,326.  Patented Mar. 26, 1867.

Witnesses:
Wm Duane Wilson
Geo Hehmick

Inventor:
John S. Stephenson
By Wm J. Goodwin
his attorney

J. S. Stephenson.
Carburetor.
N° 63,326.   Patented Mar. 26, 1867.

Sheet 2-2 Sheets.

Witnesses:
Wm Duane Wilson
Geo. Hilmick

Inventor:
John S. Stephenson
By his attorney
Wm J. Goodwin

United States Patent Office

JOHN S. STEPHENSON, OF CLEVELAND, OHIO.

Letters Patent No. 63,326, dated March 26, 1867.

---

IMPROVED APPARATUS FOR CARBURETTING GAS AND AIR.

---

The Schedule referred to in these Letters Patent and making part of the same.

---

TO ALL WHOM IT MAY CONCERN:

Be it known that I, JOHN S. STEPHENSON, of Cleveland, in the county of Cuyahoga, and State of Ohio, have invented a new and useful improvement in the Apparatus for Carburetting Air and Gas; and I do hereby declare the following to be a full and exact description of the same, reference being had to the accompanying drawings, which are made part of this specification, and in which—

Figure 3 is a side view of the mechanism by which the improvements are operated.

Figure 1:
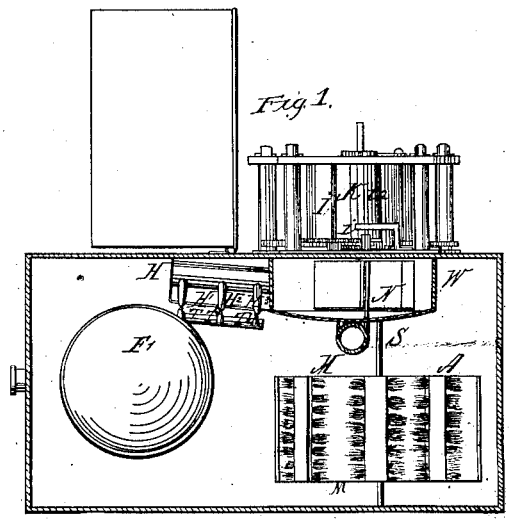
Figure 1 is a top view, looking down from above, showing a plan of a tank embodying my improvement, having the lid or top removed to show the arrangement of the apparatus within the tank.
Figure 2:
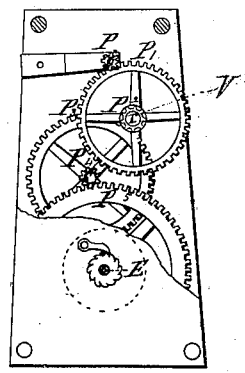
Figure 2 is a side elevation of the same, having the side of the tank removed, showing a side view of the improved apparatus.
Figure 2:
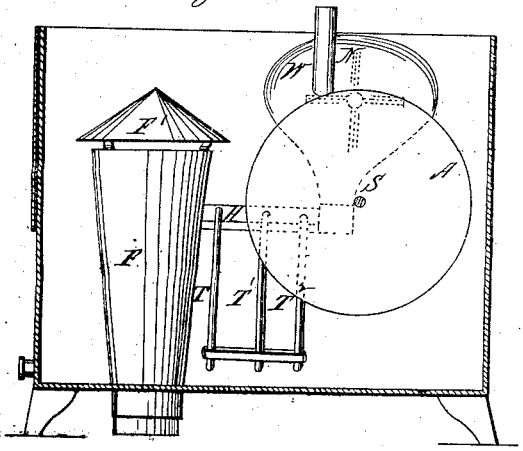
Figure 4:
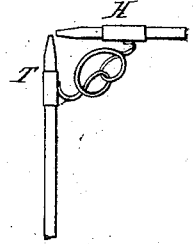
Figure 4 is a detached view of one of the air-tubes $H^1$, and one of the siphon-tubes T.
Figure 5:
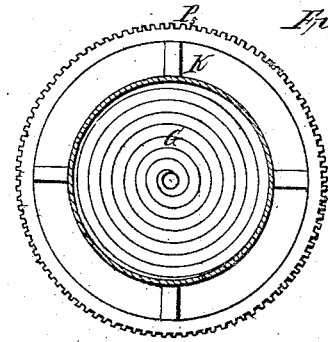
Figure 5 is a detached view of the spring G, box K, and wheel $P^5$.

Letter A represents the agitating-wheel, N the fan-wheel, which forces the air into the tank. W is the box which encloses the fan; F is a pipe, through which the carburetted air passes out of the tank.

Similar letters of reference indicate corresponding parts in the several figures.

My invention consists in a novel and very simple method of agitating carboniferous fluids within a tank, and by the means of which the air or gas that passes through is carburetted and thus prepared for use for burning purposes for making light.

I will first describe the construction of the apparatus and afterwards its operation. The tank is a box made of tin or any suitable material, having the form of a parallelopipedon, the length being double that of the width, and the height once and a half the width, and may be made of any required size, the diameter of the wheel A being about equal to half the length of the box or tank. The shaft S of the wheel A is journalled in the sides of the box at a distance from the end and bottom sufficiently to permit the wheel to turn clear; the wheel A being in one end of the box, leaves room for the funnel or pipe F in the other end. The funnel F is a pipe of conical shape, the small end passing down through the bottom of the tank, and fastened in the same; the large end, which is open, stands above the middle of the tank. W is a box attached to the side of the tank at a point nearly over the shaft S, and encloses the wheel N, having holes or openings in the top and bottom, through which the air or gas passes into the pipe H, and through the pipe and tubes $H^1$, $H^2$, and $H^3$ into the tank. N is a fan-wheel; P is a pinion-wheel on the end of the small shaft I; $P^1$ is a gear-wheel on the shaft $I^1$, which gears with the pinion P. $P^2$ is a pinion-wheel on the shaft $I^2$, which gears with the wheel $P^1$. $P^3$ is a gear-wheel mounted on the shaft S. $P^4$ is a pinion on the shaft S, in gear with the large gear-wheel $P^5$. $P^5$ is a gear-wheel attached to the drum or box K. K is a drum or box, which contains the spring mounted on the shaft, key post E, to which the spring is attached, and on which the spring G is wound up; the spring is attached or locked to the shaft E and box K in the usual manner of attaching a clock-spring, and is wound up by a key and held by a ratchet, and the operation of the spring is the same as that of a clock. The wheel A is composed of two plates of thin metal placed on the shaft S, at a distance asunder sufficient to permit the air to circulate freely between them; the plates are fastened together by thin slats or strips of thin metal laid together, having cotton or wool between them, and placed at equal distances from each other round the periphery of the wheel, and lying flat on the rims of the plates, are fastened to the same, thus forming the wheel A. Letter H is a pipe through which the air passes from the box W to the tubes $H^1$, $H^2$, and $H^3$, and through the tubes into the tank. Letters T $T^1$ $T^2$ are siphon-tubes, over the ends of which the air passes into the tank.

Having thus described the construction of the apparatus, I will proceed to describe its operation: The spring being wound up communicates power to the wheel $P^5$, which, being mounted on the box or drum K, which contains the spring; rotates with the same. $P^5$ being in gear with the pinion $P^4$ on the shaft S, causes the shaft to rotate, thus rotating the wheel A, which is mounted on the shaft S on the inside of the tank. The wheel $P^3$ being in gear with the pinion $P^2$ on the shaft $I^1$, causes the shaft to rotate, also rotating the wheel $P^1$, which, being in gear with the pinion P on the shaft I, causes the shaft to rotate, thus rotating the fan-wheel N, the revolving of which forces the air into the tank. By the arrangement of gear-wheels of different diameters, through which motion is imparted from the spring to the wheels A and N, the number of revolutions is multi- plied, causing the wheels A and N to make a greater number of revolutions in the same time than is made by the driving-wheel $P^5$, which is attached to the drum K, this arrangement being necessary in order to make the wheels A and N operate as long as possible at each winding of the spring. The carboniferous fluid is put into the tank through a hole in the top or lid; the tank should be filled with the fluid about half full at each filling, but not so full as to run into the pipe F, or cover the tops of the siphon-tubes T. The lower parts of the wheel A being immersed in the fluid, and being revolved, agitate and carry up the fluid into the air or gas, the sides of the plates or flanges, and slats or strips which extend crosswise from one plate to the other, forming a greater drying surface in the air than would be presented by the top surface of the fluid; the plates and slats, or pieces of which the wheel is composed, being very thin, and the wheel being so constructed that only the edges of the plates and slats meet with resistance in passing through the fluid, therefore requiring but little power to operate it. The wheel may be made like a drum by soldering a rim on the periphery of the plates instead of the slats, thus making a tight drum, which will not admit the fluid to its inside; the outside being wet with the fluid, would present a large drying surface in the air or gas, which causes a rapid evaporation of the fluid. The air or gas passes into the tank through the box W, pipe H, and tubes $H^1$, $H^2$, and $H^3$, blowing strongly over the ends of the siphon-tubes, draws the fluid up through them, and blows it off the ends of the siphon-tubes, scattering it in the air, filling the tank with the fluid in mist or spray, thus thoroughly carburetting the air or gas while passing through the tank. The air thus carburetted passes out of the tank through the pipe F.

Having thus described my invention, what I claim as new, and desire to secure by Letters Patent, is—

The combination of the tubes H and T with the agitating-wheel A and fan-wheel N and funnel pipe F, constructed as described, and arranged to operate in the manner set forth.

JOHN S. STEPHENSON.

Witnesses:
C. R. SQUIRE,
WM. F. GOOWIN.